United States Patent
Snider et al.

(10) Patent No.: US 11,174,738 B1
(45) Date of Patent: Nov. 16, 2021

(54) SACRIFICIAL PLUG SYSTEM

(71) Applicant: General Electric Company, Schenectady, NY (US)

(72) Inventors: Zachary John Snider, Simpsonville, SC (US); Matthew Troy Hafner, Honea Path, SC (US); Jeffrey Clarence Jones, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 48 days.

(21) Appl. No.: 16/868,165

(22) Filed: May 6, 2020

(51) Int. Cl.
  *F01D 5/18* (2006.01)
  *F01D 5/28* (2006.01)

(52) U.S. Cl.
  CPC ............. *F01D 5/189* (2013.01); *F01D 5/288* (2013.01); *F05D 2230/53* (2013.01); *F05D 2230/90* (2013.01); *F05D 2260/201* (2013.01)

(58) Field of Classification Search
  CPC .... C23C 4/01; C23C 4/02; C23C 4/18; F01D 5/186; F01D 5/288; F01D 25/12; F01D 5/187; B05D 1/32
  See application file for complete search history.

(56) References Cited

U.S. PATENT DOCUMENTS

| | | | |
|---|---|---|---|
| 4,743,462 A | 5/1988 | Radzavich | C23C 4/02 427/282 |
| 5,902,647 A | 5/1999 | Venkataramani | B05D 1/32 427/454 |
| 6,335,078 B2 | 1/2002 | Venkataramani | C23C 4/01 428/139 |
| 9,181,809 B2 | 11/2015 | Roberts, Jr. | C23C 14/042 |
| 9,206,499 B2 | 12/2015 | Zimmerman | C23C 4/01 |
| 2001/0007708 A1 | 7/2001 | Venkataramani | C23C 4/01 428/139 |
| 2012/0052200 A1 | 3/2012 | Zimmerman | C23C 4/01 427/248.1 |

*Primary Examiner* — Eldon T Brockman
(74) *Attorney, Agent, or Firm* — James Pemrick; Hoffman Warnick LLC

(57) ABSTRACT

Aspects of the embodiments set forth a sacrificial plug system including a component having a surface and at least one cooling hole in the surface; a sacrificial plug integrally formed with the component and integrally formed in the at least one cooling hole, where the sacrificial plug includes a top portion; a cover portion; and a bottom portion, the bottom portion integrally formed, engaged to, and connected to at least one cooling hole. The sacrificial plug system also includes at least one connective member integrally formed with the bottom portion of the sacrificial plug and integral with an inner wall of each respective at least one cooling hole; each at least one connective member being severable from the respective inner wall when a force is applied to the top portion, thus permitting the sacrificial plug to be removed from the at least one respective cooling hole.

20 Claims, 10 Drawing Sheets

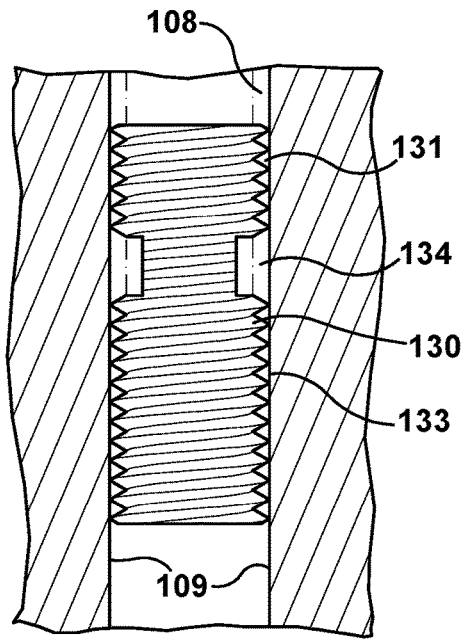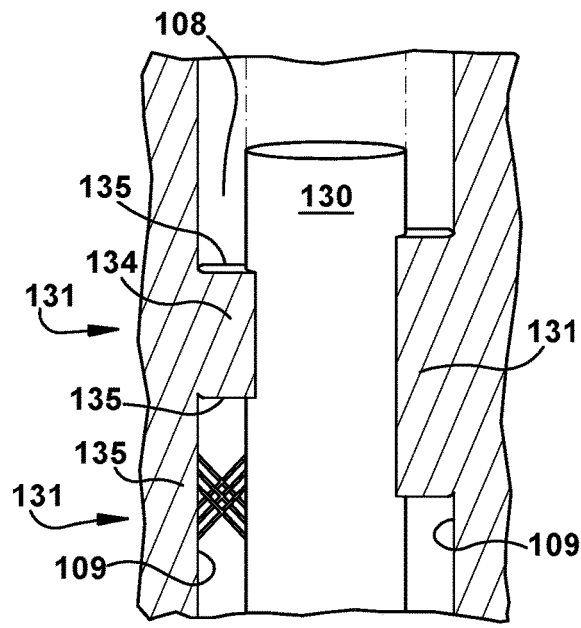
Fig. 10  Fig. 11
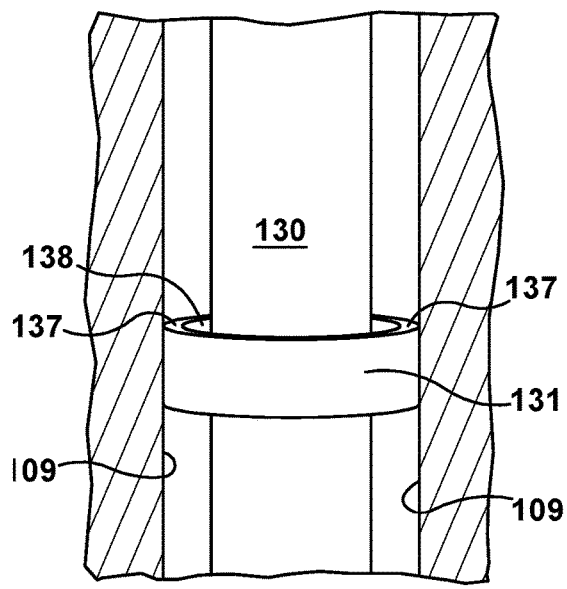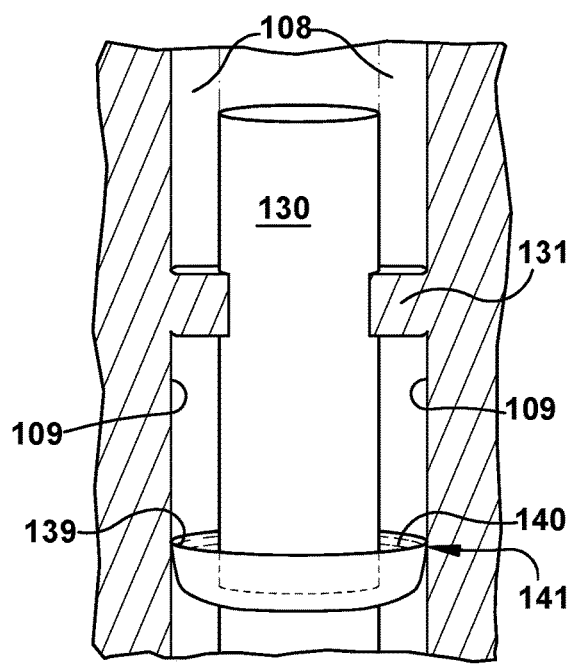
Fig. 12  Fig. 13

US 11,174,738 B1

SACRIFICIAL PLUG SYSTEM

BACKGROUND

The disclosure relates generally to sacrificial plug systems, and more particularly, to sacrificial plug systems for a component having cooling holes protecting the cooling hole's configuration during post formation processing.

BRIEF DESCRIPTION

A first aspect of the embodiments sets forth a sacrificial plug system including a component having a surface and at least one cooling hole in the surface; a sacrificial plug integrally formed with the component and integrally formed in the at least one cooling hole. The sacrificial plug includes a top portion; a cover portion; and a bottom portion, the bottom portion integrally formed, engaged to, and connected to at least one cooling hole. The sacrificial plug system also includes at least one connective member integrally formed with the bottom portion of the sacrificial plug and integral with an inner wall of each respective at least one cooling hole; each at least one connective member being severable from the respective inner wall when a force is applied to the top portion, thus permitting the sacrificial plug to be removed from the at least one respective cooling hole.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 10 shows a schematic perspective view of yet a further embodiment of connective members of the sacrificial plug's cooling hole engaging portion engaging cooling hole at line 6-6 (FIG. 5) according to embodiments of the disclosure;

FIG. 11 shows a schematic perspective view of still another embodiment of connective members of the sacrificial plug's cooling hole engaging portion engaging cooling hole at line 6-6 (FIG. 5) according to embodiments of the disclosure;

FIG. 12 shows a schematic perspective view of another embodiment of connective members of the sacrificial plug's cooling hole engaging portion engaging cooling hole at line 6-6 (FIG. 5) according to embodiments of the disclosure;

FIG. 13 shows a schematic perspective view of still another embodiment of connective members of the sacrificial plug's cooling hole engaging portion engaging cooling hole at line 6-6 (FIG. 5) according to embodiments of the disclosure;

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
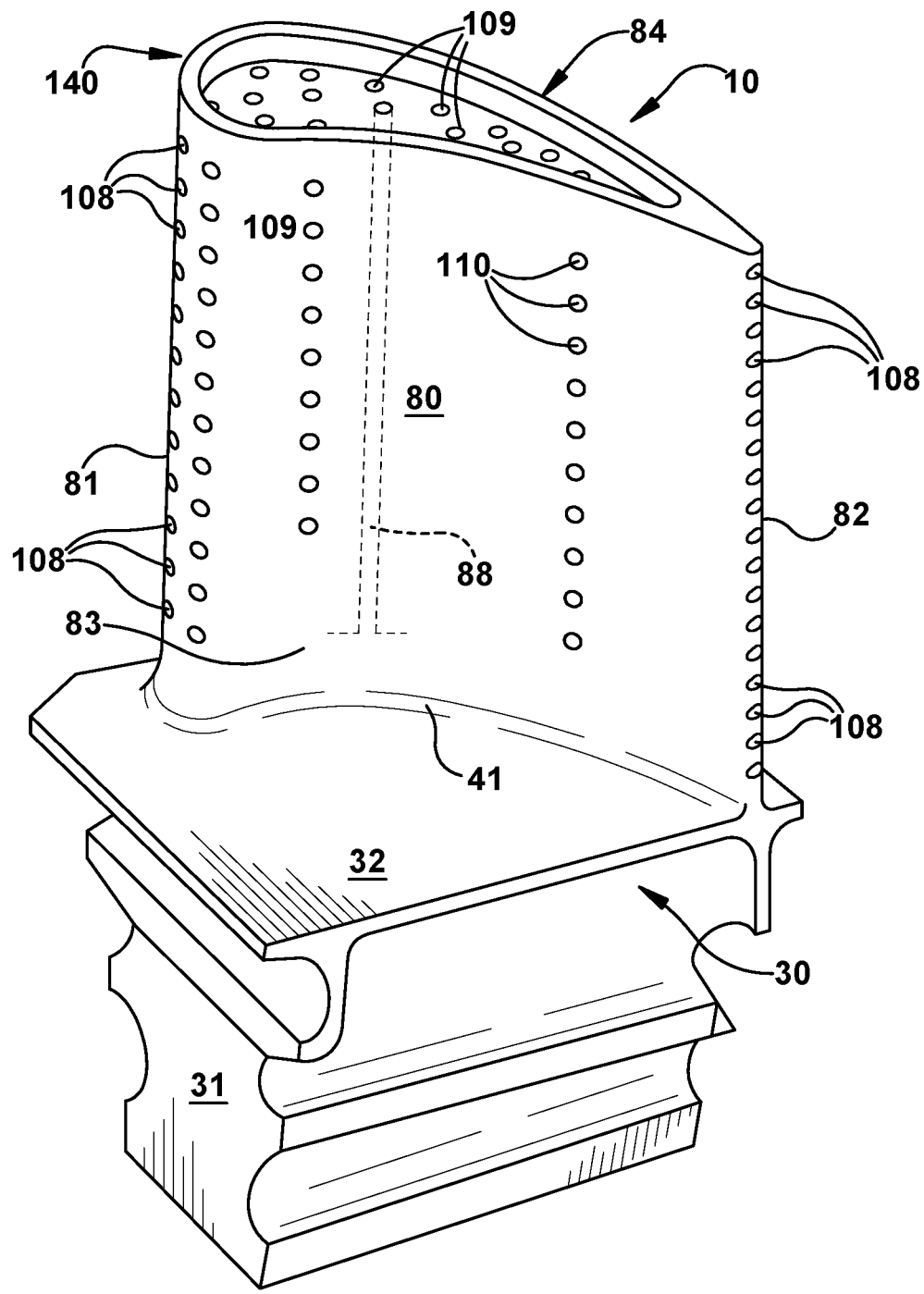
FIG. 1 shows a schematic perspective of a blade according to embodiments of the disclosure.

As an initial matter, in order to clearly describe the current technology it will become necessary to select certain terminology when referring to and describing sacrificial plug systems for a component having cooling holes protecting the cooling hole's configuration, especially during any post formation processing. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine.

It is often required to describe parts that are disposed at differing radial positions with regard to a center axis. The term "radial" refers to movement or position perpendicular to an axis. For example, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Where an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As indicated above, the disclosure relates to sacrificial plug systems. In particular, the disclosure relates to sacrificial plug systems for a component having cooling holes protecting the cooling hole's configuration to avoid subsequent post formation processing, for example protection from coating bridging or blocking cooling holes in the component.

To facilitate understanding of embodiments of the disclosure, it is known that the pace of change and improvement in the realms of power generation, aviation, and other fields has accompanied extensive research for manufacturing components used in these fields. Conventional manufacture of metallic, plastic or ceramic composite components generally includes milling or cutting away regions from a slab of material before treating and modifying the cut material to yield a part, which may have been simulated using computer models, e.g., in drafting software. Manufactured components which may be formed from metal can include, e.g., airfoil components for installation in a turbomachine such as an aircraft engine or power generation system.

Additive manufacturing (AM) includes a wide variety of processes of producing a component through the successive layering of material rather than the removal of material. As such, additive manufacturing can create complex geometries without the use of any sort of tools, molds or fixtures, and with little or no waste material. Instead of machining components from solid billets of material, much of which is cut away and discarded, the only material used in additive manufacturing is what is required to shape the component.

Additive manufacturing techniques typically include taking a three-dimensional computer aided design (CAD) file of the component to be formed, electronically slicing the component into layers, e.g., 18-102 micrometers thick, and creating a file with a two-dimensional image of each layer, including vectors, images or coordinates. The file may then be loaded into a preparation software system that interprets the file such that the component can be built by different types of additive manufacturing systems. In 3D printing, rapid prototyping (RP), and direct digital manufacturing (DDM) forms of additive manufacturing, material layers are selectively dispensed, sintered, formed, deposited, etc., to create the component.

In metal powder additive manufacturing techniques, such as direct metal laser melting (DMLM) (also referred to as selective laser melting (SLM)), metal powder layers are sequentially melted together to form the component. More specifically, fine metal powder layers are sequentially melted after being uniformly distributed using an applicator on a metal powder bed. Each applicator includes an applicator element in the form of a lip, brush, blade or roller made of metal, plastic, ceramic, carbon fibers or rubber that spreads the metal powder evenly over the build platform. The metal powder bed can be moved in a vertical axis. The process takes place in a processing chamber having a precisely controlled atmosphere. Once each layer is created, each two dimensional slice of the component geometry can be fused by selectively melting the metal powder. The melting may be performed by a high powered melting beam, such as a 100 Watt ytterbium laser, to fully weld (melt) the metal powder to form a solid metal. The melting beam moves in the X-Y direction using scanning mirrors, and has an intensity sufficient to fully weld (melt) the metal powder to form a solid metal. The metal powder bed may be lowered for each subsequent two dimensional layer, and the process repeats until the component is completely formed.

Further, turbine components, such as but not limited to airfoils, turbine blades, and vanes (nozzles) of gas turbine engine often require a complex cooling scheme in which cooling air flows through the airfoil and is then discharged through carefully configured cooling holes. For example, but merely illustrative of the disclosure, a component's cooling holes may include cooling holes at a trailing edge of the airfoil. Turbine blade performance is related to the ability to provide uniform cooling of airfoil surfaces. Consequently, the control of cooling hole size and shape is important in turbine airfoil designs because size and shapes of the opening may determine flow amounts exiting a given hole, hole distribution across the airfoil, and overall flow distribution within the cooling circuit. Other factors, such as backflow margin, are also affected by variations in opening size. Thus protecting cooling holes' intended configuration, including after post component processing, such as coating, will enable cooling holes to fulfill their expected function.

In addition to conventional hole drilling techniques, such as laser machining and electrical-discharge machining (EDM), complex advanced casting practices may be used to yield airfoils with dimensionally correct cooling hole openings in order to repeatably control opening size. Once cast, subsequent airfoil manufacturing operations must be performed such that cast-to-size cooling hole openings are not processed through operations that would alter the dimensions of some or all of the cooling hole openings.

However, with increasingly complex air passage criteria for some turbines, additive manufacturing processes (as discussed above) have been employed to form turbine components. Additive manufacturing processes enable formation of intricate, serpentine, and complex cooling passages and cooling hole openings, in manners easier, more efficient, and less costly than some traditional formation methods.

Regardless of how formed, with increasingly severe operating environments of turbine components, protective coatings are typically applied to turbine components when manufactured and possibly also during repair. Modern high efficiency combustion turbines have firing temperatures that exceed about 1,000 degree C., and even higher firing temperatures are expected as the demand for more efficient engines continues. Many components that form the "hot gas path" combustor and turbine sections are directly exposed to aggressive hot combustion gasses, for example, the combustor liner, the transition duct between the combustion and turbine sections, and the turbine stationary vanes and rotating blades and surrounding ring segments. In addition to thermal stresses, these and other components are also exposed to mechanical stresses and loads that further wear on the components.

Many iron-, cobalt-, and nickel-based superalloy materials traditionally used to fabricate the majority of combustion turbine components used in the hot gas path section of the combustion turbine engine are insulated from the hot gas flow by coating the components with protective coatings in order to survive long term operation in this aggressive high temperature combustion environment. Protective coatings include, but are not limited to, thermal barrier coatings (TBC), bond coats, environmental barrier coatings (EBC), combinations thereof, and other coatings now known or hereinafter developed. Protective coatings can be produced by a multi-step process that includes coating surfaces requiring a protective coating for example with a bond coat and subsequent additional coats, dependent on the intended use of the turbine component and the environment associated with the use.

TBCs are highly advanced material systems. These coatings serve as protective coatings to insulate the components from large and prolonged heat loads by utilizing thermally insulating materials which can sustain an appreciable temperature difference between the load bearing alloys and the coating surface. In doing so, these coatings can allow for higher operating temperatures while limiting the thermal exposure of structural components, extending component life by reducing oxidation and thermal fatigue.

TBCs are applied by various methods to a turbine component. Spraying is often used to apply a TBC (or other coating). Illustrative spray application processes include, but are not limited to, plasma spraying both in air and vacuum, cold spraying, electrostatic spraying, electron beam physical vapor disposition, chemical vapor deposition, thermal spraying, high-velocity oxy-fuel coating, physical vapor disposition, combinations thereof, and other spraying techniques now known or hereinafter developed.

One aspect of spray coating a part, such as a blade 10, according embodiments of the disclosure, surrounds control, or lack thereof, of the spray around the cooling holes 108 of blade 10. Controlling means the spray avoids bridging around cooling holes 108 and subsequent need for rework. Of course, any coating or other post processing/formation component processing must not prevent the airfoil from meeting operational requirements, including cooling air airflow requirements through the airfoil and exiting through cooling holes at the airfoil surface.

One post processing/formation coating outcome that should be avoided is "bridging," which is when subsequent post formation coating processes cover and alter spacing between cooling holes and/or closing of cooling holes. Bridging can be caused by too much post formation coating process material between cooling holes and possibly in cooling holes, thus reducing a cooling hole opening size. If too much post formation coating process material is present, one or more of the cooling holes may actually be totally covered or bridged over. Of course, for maintaining the expected function of the cooling holes, bridging should be kept controlled and minimal as much as possible.

As will be discussed in detail hereinafter, bridging is due to the "shadowing" effect of spray (for example but not intended to limit the embodiments, TBC) as it deposits on the component, here blade 10. The shadowing effect may be best visualized by placing an object in front of a light source and observing the shadow cast by that object. Light rays passing around the object is representative of spray being deposited, while the shadow cast by the object is representative of a void in the deposited spray. However, holes (such as cooling holes 108) that are too small or too close to each other can create a bridge as coating can build upon itself "bridge" over the holes, in a natural process called shadowing. At these holes, coating can block holes. Also, coating material may not be rigorously bonded or adhered to the component or substrate. Thus, re-work will be needed to clear the holes 108 of the "bridge" (when the coating is built up over the targeted area and hole) or re-coat at locations (where coating is not rigorously bonded or adhered to the component or substrate), which may prolong processing time, require further resources, and may cause lost opportunity costs, and the like.

In view of the above, the disclosure sets forth systems, methods, and structures for preventing deposition of coatings into cooling holes. In addition to reducing or almost eliminating change in cooling hole size and shape resulting from coating material entering a cooling hole via bridging, an additional benefit of the disclosure in preventing coating in cooling holes may be realized in the amount of coating material consumed by the coating operation is reduced.

As illustrated in FIG. 1, a turbine blade 10 includes an airfoil 80. Airfoil 80 includes a leading edge 81 and a trailing edge 82, a pressure side wall 83, and a suction side wall 94. Pressure side wall 83 is connected to suction side wall 84 at leading edge 81 and trailing edge 82. Airfoil 80 further includes a tip 40 and a root 30 connected at fillet 41 by pressure side wall 83, suction side wall 84, leading edge 81, and trailing edge 82. Root 30 includes a platform 32 and a dovetail 31.

Turbine blade 10 includes at least one cooling cavity 88 (only one cavity 88 illustrated in FIGS. 1 and 5 for ease of illustration and clarity) between pressure side wall 83 and suction side wall 84. Each cooling cavity 88 is in flow communication with one or a plurality of cooling holes 108, 109. The plurality of cooling holes 108 includes, but are not limited to, leading edge and trailing edge cooling holes 108 which extend along and through leading edge 81 and trailing edge 82. Trailing edge cooling holes 108 are substantially round, however noting their position on curved trailing edge 82 a slight ellipsoidal or elongated configuration to those trailing edge cooling holes 108 is possible. As discussed herein, reference can be made to either circular cooling holes or other configurational cooling holes are aspects of the disclosure. Use of singular "cooling hole" or the plural "cooling holes" is not intended to limit the embodiments of the disclosure unless explicitly discussed. The remainder of the description will reference cooling hole 108.

Other cooling holes 109 are substantially circular and extend through airfoil 80 at body locations that enable desired cooling of the blade 10 from internal cooling passages of the at least one cooling cavity 88. Other cooling holes 109 can be disposed at tip 40 of airfoil 80, as well as along portions of the body of airfoil 80.

In accordance with aspects of the disclosure, a sacrificial plug system including a sacrificial plug 100 or cover (hereinafter "sacrificial plug") can be integrally printed with a component with an additively manufactured (i.e., printed) blade 10 in one or more cooling holes 108. By additively manufacturing the component and sacrificial plug 100 integrally and at the same time as an integral and one-piece structure with blade 10 and in hole 108 of the component, alignment and proper positioning of sacrificial plug 100 in cooling hole 108 is attained. Thus, positioning of sacrificial plug 100 reduces or eliminates bridging between cooling holes in a component during post additively manufacturing coating processing.

The structure of the sacrificial plug 100 will first be discussed and then its integrally additively manufactured formation with an illustrative turbine component and hole 108 will be described. Sacrificial plug 100, as embodied by the disclosure and illustrated in FIGS. 2 and 3, comprises a top portion 110, a cover portion 120, and a cooling hole engaging portion 130. Sacrificial plug 100 is formed as a unitary element, and as described herein, is formed during the additive manufacturing of the turbine component, and formed with and in cooling hole 108. This contemporaneous formation essentially assures that sacrificial plug 100 and cooling hole 108 will be suitably corresponding and paired, and as discussed hereinafter, aligned and positioned in an integrally connectively form.

Top portion 110 extends up from the turbine component to which sacrificial plug 100 is formed. Top portion 110 has an elongated configuration that enables a user or a user's tooling to grasp the top portion 110. By grasping top portion 110 and manipulating sacrificial plug 100, sacrificial plug 100 may be removed from cooling hole 108, as described hereinafter. Thus, top portion 110 facilitates grasping, including at least one of but not limited to, knurled surfaces; contoured surfaces to fit fingers, tools, or machinery; rounded surfaces; prismatic surfaces; knobbed surfaces; hooked surfaces; surfaces that facilitate engagement with machines provide motive forces to remove (see FIGS. 15-17, as described hereinafter), or any other structure that facilitates grasping, now known or hereinafter developed.

Moreover, top portion 110 can be circular, elliptical, polygonal, or any other shape that enables and facilitates grasping and removal of the sacrificial plug 100. Top portion 110 of sacrificial plug 100 may be formed as at least one of a solid portion, hollow portion, formed in a lattice structure, or any other configuration that provides sufficient rigidity for removal, as described here.

Figure 4:
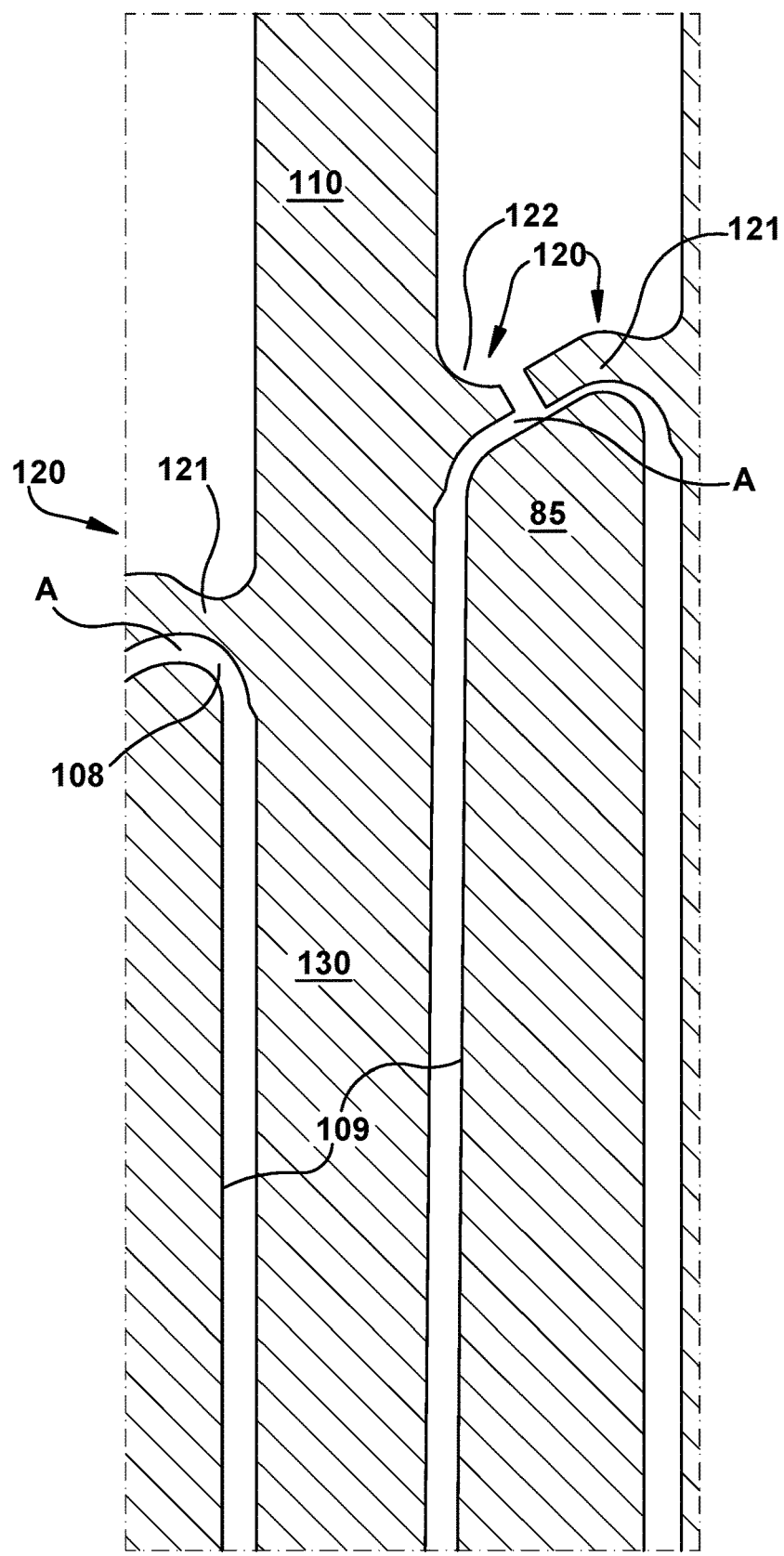
FIG. 4 shows a schematic close up view of sacrificial plugs in cooling holes of a blade according to embodiments of the disclosure.

Cover portion 120 overlies a surface of component surrounding cooling hole 108 into which the sacrificial plug 100 is formed. The overlying aspect of the cover portion 120 occurs with additive manufacturing of cover portion 120. The additive manufacturing process forms cover portion 120 distance A above surface 85 of turbine blade 10 at cooling hole 108 (FIG. 4). Distance A is large enough to permit limited amounts of coating to enter under cover portion 120. Cover portion 120 is set a distance above surface 85 that enables coating to flow around and under it to surface 85.

However, cover portion 120 configuration limits amounts of coating that can enter under cover portion 120. Distance A is a predetermined distance set and controlled additive manufacturing provides cover portion 120 a distance A above surface 85, in consideration of possible post-printing coating process(es) possibly needed. Thus, understanding post-printing coating process(es) will enable distance A to be set, and enable permitting an acceptable amount of coating to enter under cover portion 120 to coat surface 85 but not bridge holes 108. By purposefully and advantageously setting distance A, limiting coating amounts under cover portion 120, sacrificial plug 100 prevents excess coating material around cooling holes 108 and prevents bridging between cooling holes 108.

Figure 2:
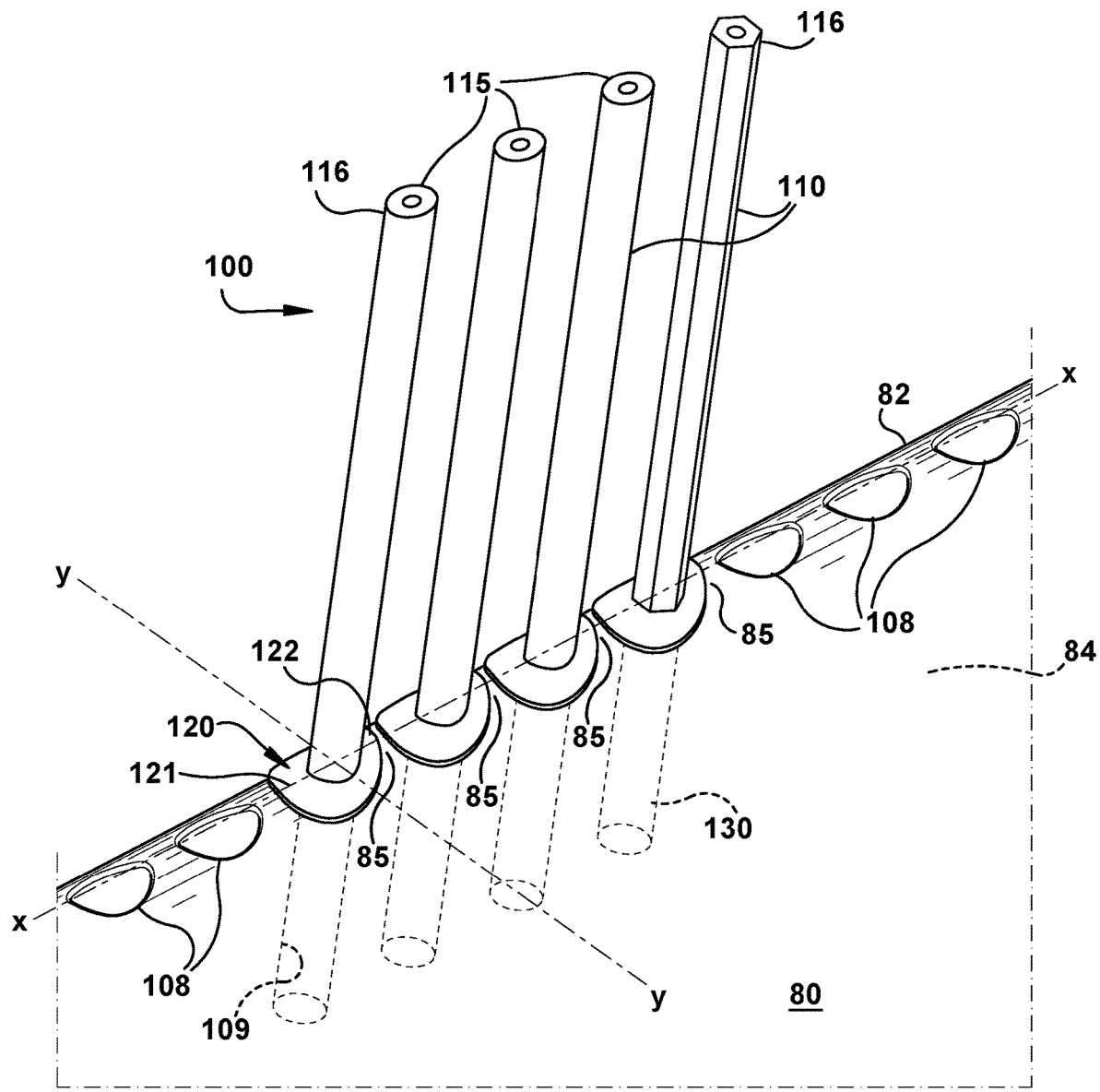
FIG. 2 shows a schematic perspective view of sacrificial plugs in cooling holes of a blade according to embodiments of the disclosure.
Figure 3:
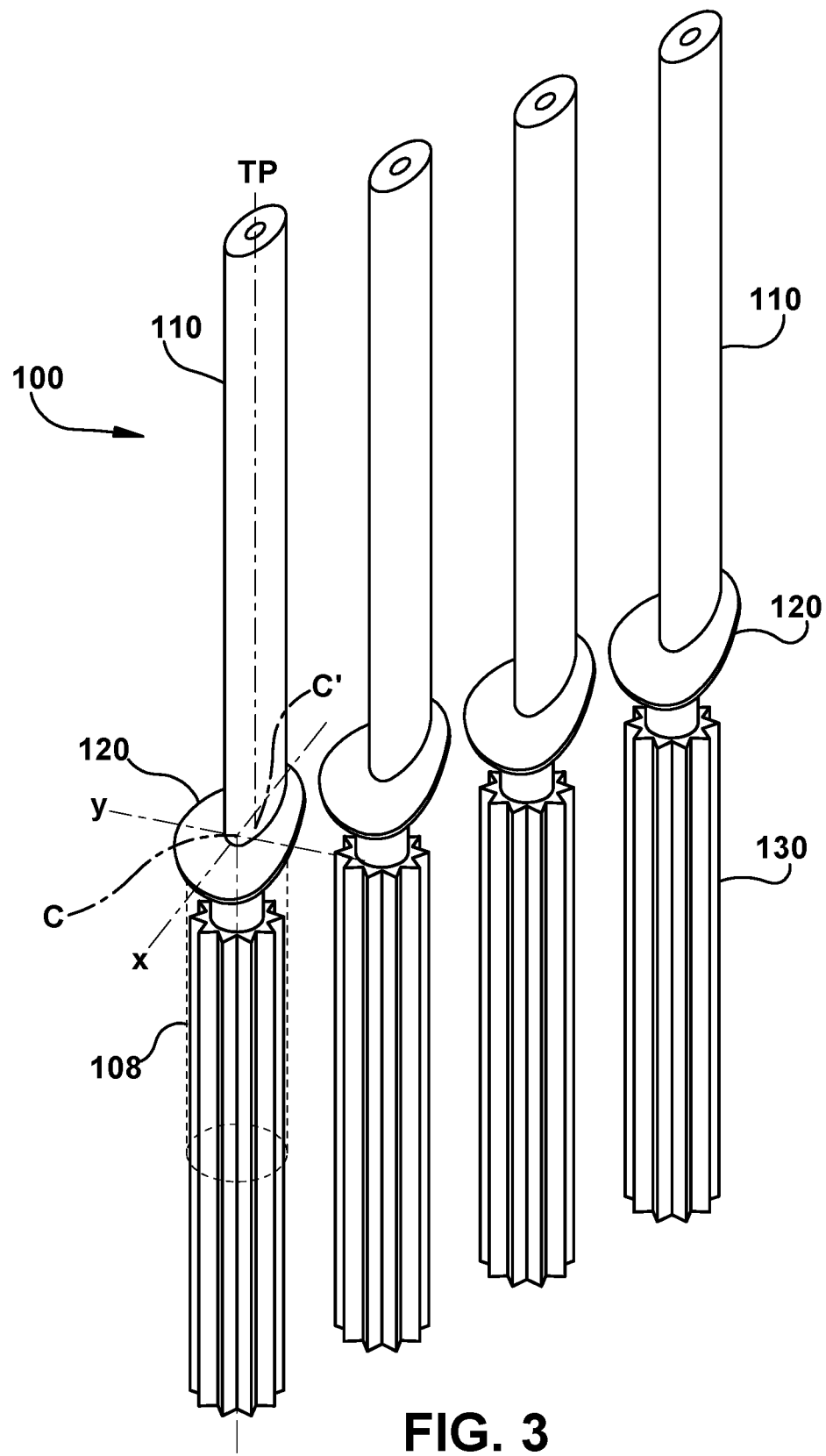
FIG. 3 shows a schematic perspective view of sacrificial plugs according to embodiments of the disclosure.

As illustrated, Noting FIGS. 2 and 3, cover portion 120 is generally a hyperbolic paraboloid configuration but without a peripheral elevational rise in the x-axis. As an approximate hyperbolic paraboloid configuration, each cover portion 120 has an x-axis and a y-axis. X-axis follows apex of trailing edge 82 at a curved component surface 85. The cover portion contour of cover portion 120 along the x-axis generally mirrors the component contour of curved component surface 85. Moreover, in the y-axis cover portion 120 follows curvature of curved component surface 85 at trailing edge 82 as it extends to both pressure side wall 83 and suction side wall 84.

As also illustrated in FIGS. 2-5, cover portion 120 is not coaxially symmetrical with top portion 110 or coaxial with cooling hole 108. Rather, as seen in FIG. 3, x-axis and y-axis define a center C of cooling hole 108 (in phantom FIG. 3). Cover portion 120 is disposed off center from center C and aligns with top portion 110 center axis TP at mid-point C'. Mid-point C' is on x-axis but is spaced a distance from center C of cooling hole 108.

As is illustrated in FIGS. 2 and 4, positioning of cover portion 120 with top portion 110 provides extended overlap of cooling hole 108 at a larger side area 121 of cover portion 120. Shorter side area 122 still overlaps and covers cooling hole 108. The formation of sacrificial plug 100 in adjacent cooling holes 108 positions cover portion 120 with each larger side area 121 adjacent a respective shorter side area 122 (with the exception of the first and last sacrificial plugs 100 of a series which have no adjacent sacrificial plugs on both sides).

Cooling hole engaging portion 130 is integrally formed during the additive manufacturing of the turbine component and is integrally connected to a peripheral inner surface 109 of cooling hole 108. Thus, sacrificial plug 100 is integrally formed and connected with turbine component as a unit before being severed and its removal (to be described hereinafter). The connected aspect of cooling hole engaging portion 130 to cooling hole 108 at its peripheral inner wall 109 enables sacrificial plug 100 to be stably set in cooling hole 108 during additive manufacturing.

The cooling hole engaging portion 130 is formed with turbine component for severable removal of the sacrificial plug 100 after post printing processes/operations, such as but not limited to coating. Thus, cooling hole engaging portion 130 has at least one severable connection, and preferably more than one severable connections, between cooling hole engaging portion 130 and peripheral inner surface 109 of cooling hole 108. This connection is formed during integral additive manufacturing of turbine component and sacrificial plug 100 as a unit. The connection defines a severable, frangible, breakaway, rupturable, or separable connection (hereinafter "separable connection") therebetween as discussed herein. This separable connection is solid enough to maintain sacrificial plug 100 in place but fragile or brittle enough to permit separation between cooling hole engaging portion 130 and peripheral inner surface 109 of cooling hole 108 when sufficient force is applied to top portion 110.

For example, and in no manner limiting of the embodiments, the separable connection between cooling hole engaging portion 130 and peripheral inner surface 109 of cooling hole 108 is formed during additive manufacturing of turbine component and sacrificial plug 100. The separable connection 131 will be formed at a lowest point of the sacrificial plug 100 extent into hole 108 in accordance with additive manufacturing processing. Separable connection 131 can be formed as at least one separable connective member 131 (FIG. 5).

Figure 5:
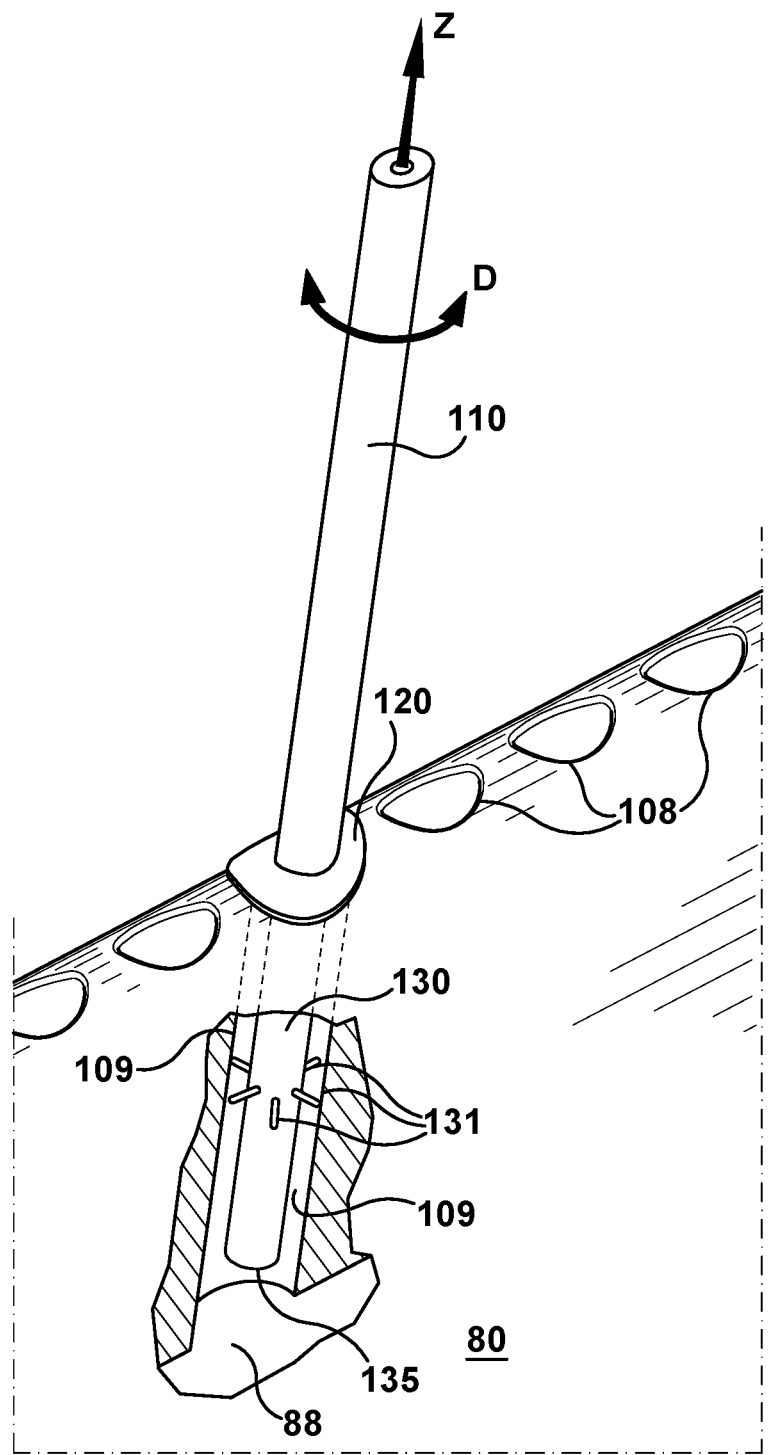
FIG. 5 shows a schematic close up view of a sacrificial plug in cooling holes and cooling passages of a blade according to embodiments of the disclosure.

In FIG. 5, each separable connective member 131 includes at least one additively manufactured connective member 131 attached to both cooling hole engaging portion 130 and peripheral inner surface 109 of cooling hole 108. Therefore, given the severable nature of connective member 131, when a force is applied to top portion 110 in direction Z (FIG. 5) for removing the sacrificial plug 100 from cooling hole 108, each connective member 131 will sever. Accordingly, each connective member 131 can separate cooling hole engaging portion 130 from peripheral inner surface 109 of cooling hole 108. In addition to a force applied in direction Z, a rotational force (see arrow D FIG. 5) can also be applied to sever connective member 131 from peripheral inner surface 109 of cooling hole 108. Once severed from the wall 109 of cooling hole 108, sacrificial plug 100 can be removed in direction Z from cooling hole 108.

Connective member 131 maintains sacrificial plug 100 in cooling hole 108, until a sufficient force is applied to separate sacrificial plug 100 from wall 109 of cooling hole 108. The number of connective members 131, as well as their location with respect to location, orientation, distribution, and structure, can vary according to aspects of the disclosure. Further, connective members 131 can include one or more of the connective members 131. Connective member 131 are discussed herein individually or in combination with other connective members 131. Furthermore, at least one connective member 131 can be disposed on any portion of cooling hole engaging portion 130 at peripheral inner surface 109 of cooling hole 108 as long as at least one connective member 131 is initiated during additive manufacturing at the lowest point 135 of cooling hole engaging portion 130.

Figure 6:
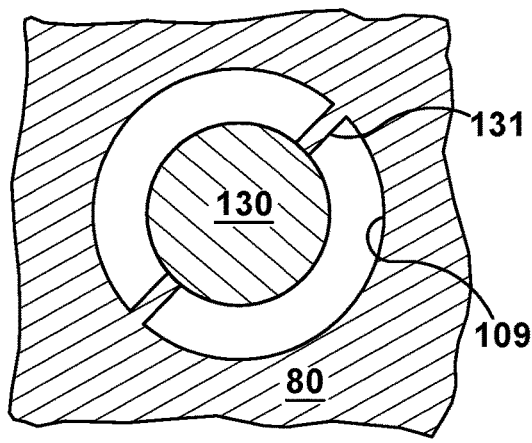
FIG. 6 shows a schematic perspective view of connective members of the sacrificial plug's cooling hole engaging portion engaging cooling hole at line 6-6 (FIG. 5) according to embodiments of the disclosure.
Figure 7:
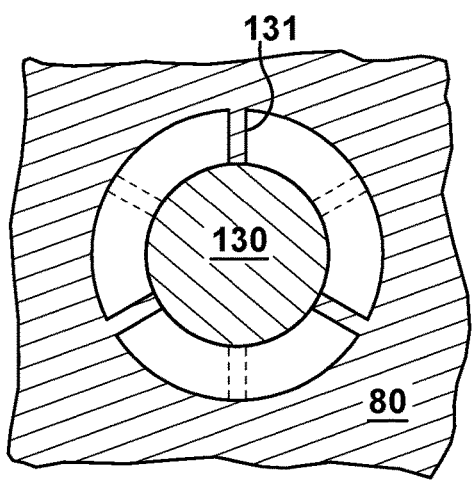
FIG. 7 shows a schematic perspective view of further connective members of the sacrificial plug's cooling hole engaging portion engaging cooling hole at line 6-6 (FIG. 5) according to embodiments of the disclosure.

With reference to FIGS. 6-14 illustrative various configurations of connective members 131 with a cooling hole engaging portion 130 at peripheral inner surface 109 at line 6-6 (FIG. 5) are shown. FIG. 6 illustrates connective members 131 in the form of two finger connective members 131 connecting cooling hole engaging portion 130 to peripheral inner surface 109. FIG. 7 illustrates connective members 131 as three finger connective members 131 connecting cooling hole engaging portion 130 to peripheral inner surface 109 of cooling hole 108. In FIG. 7, more than three connective members 131 can be formed during additive manufacturing of the turbine component and sacrificial plug 100 (see the phantom outlines). In accordance with aspects of the disclosure, connective members 131 formed during the additive manufacturing can be spaced at regular intervals or irregularly, unevenly spaced intervals as long as connective members 131 connect cooling hole engaging portion 130 to peripheral inner surface 109 of cooling hole 108.

Figure 8:
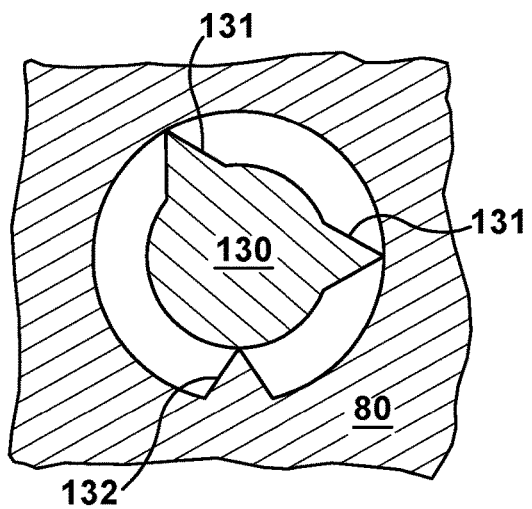
FIG. 8 shows a schematic perspective view of still further connective members of the sacrificial plug's cooling hole engaging portion engaging cooling hole at line 6-6 (FIG. 5) according to embodiments of the disclosure.

In FIG. 8, connective members 131 include triangular connective members 131 connecting cooling hole engaging portion 130 to peripheral inner surface 109 of cooling hole 108. In FIG. 8, the base of triangular connective members 131 can additively manufactured of the turbine component and the sacrificial plug 100 either on cooling hole engaging portion 130 to peripheral inner surface 109 of cooling hole 108. Alternately, a base of inverted triangular connective members 132 (in FIG. 8 only) can be formed on peripheral inner surface 109 of cooling hole 108 connecting to cooling hole engaging portion 130.

Figure 9:
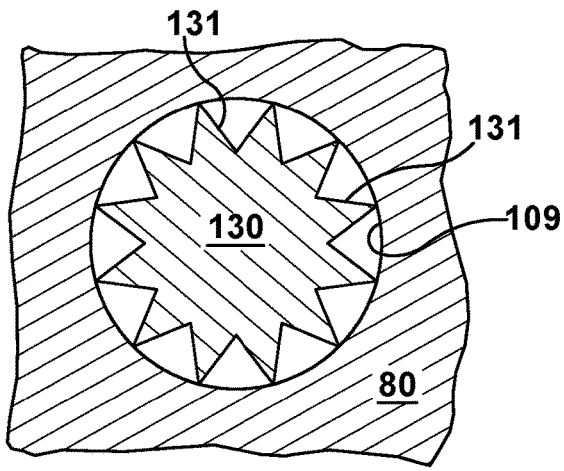
FIG. 9 shows a schematic perspective view of yet another embodiment of connective members of the sacrificial plug's cooling hole engaging portion engaging cooling hole at line 6-6 (FIG. 5) according to embodiments of the disclosure.

FIG. 9 illustrates triangular connective members 131 formed during the additive manufacturing of the turbine component and the sacrificial plug 100 as a full 360° peripheral array on cooling hole engaging portion 130 connecting to peripheral inner surface 109 of cooling hole 108. FIG. 10 illustrates another configuration for connective members 131 positioned on cooling hole engaging portion 130 connecting to peripheral inner surface 109 of cooling hole 108. In FIG. 10, connective members 131 are formed during the additive manufacturing in a "screw-thread" configuration. One or more of the threads 133 of connective members 131 may be formed on cooling hole engaging portion 130 engaging with peripheral inner surface 109 of cooling hole 108. Some threads 134 may be eliminated or formed spaced from the peripheral inner surface 109 of cooling hole 108 in a stepped formation. This stepped formation may conserve materials as well as facilitate severing when a force is applied to top portion 110 to remove sacrificial plug 100.

FIG. 11 illustrates elongated connective members 131 on cooling hole engaging portion 130 with an elongated engagement with peripheral inner surfaces 109 of cooling hole 108. Connective members 131 may be formed at any and varying lengths with cooling hole engaging portion 130 as it engages with peripheral inner surface 109 of cooling hole 108. Moreover, any number of connective members 131 may engage with peripheral inner surface 109 of cooling hole 108. Additionally, any combination of connective members 131 as discussed herein may be used with each other. Also, given the restrictions of 2-d illustrations, the connective members 131 of FIG. 11 and other connective member 131 configurations within the scope of the disclosure need not be "linear" but can have any shape and configuration in and out of the plane of the drawings, such as spiraling around cooling hole engaging portion 130.

Moreover, in accordance with aspects of the disclosure, FIG. 11 illustrates connective member 131 including struts 135 interconnected by a web 134 of severable members. In the configuration of FIG. 11, connective member 131 is severable when a force is applied to remove sacrificial plug 100 from cooling hole 108 when struts 135 and web 134 sever. Also, as in FIG. 11, a further configuration of connective member 131 without strut fingers that includes a web 136 of severable members formed during the additive manufacturing of the turbine component and the sacrificial plug 100. In this aspect of FIG. 11, connective member 131 is severable when a force is applied to remove sacrificial plug 100 from cooling hole 108 when web 136 is severed.

FIG. 12 sets forth a further aspect of connective member 131 as embodied by the disclosure. In FIG. 12, the connective member 131 formed during additive manufacturing includes at least one connective member 131 formed with a zone 137 of additively printed/manufactured controlled mechanical properties. Zone 137 includes material properties controlled during additive manufacturing with reduced density, elasticity, and malleability, and with increased stiffness and brittleness, compared to the remainder zone 138 of connective member 131. Zone 137 is an area where connective member 131 of FIG. 12 will likely sever, with remainder zone 138 retained intact on cooling hole engaging portion 130. As the sacrificial plug 100 is removed from cooling hole 108, connective member 131 moves up in cooling hole 108 with remainder zone 138 thereon. Any materials (regardless of source) in cooling hole 108 can get caught on remainder zone 138 of connective member 131 and gets moved with connective member 131 in a similar manner as a hand pump piston. Moreover, if remainder zone 138 is close to wall 109 of cooling hole 108, connective member 131 can act as a scraper to further remove material from walls 109 of cooling hole 108.

Another configuration of cooling hole engaging portion 130 includes a connective member 131 and capture member 141, as illustrated in FIG. 13. Capture member 141 is formed during additive manufacturing of turbine component and sacrificial plug 100, and includes a trough or depression 140. In a similar manner as described above with respect to FIG. 12, connection 139 includes a material similar to that of zone 137 so it severs at that periphery and remainder of connective members 131 remains intact. Depression 140 acts as a collector and retainer of material in the cooling hole 108. As the sacrificial plug 100 is removed from cooling hole 108, materials (regardless of source) in cooling hole 108 can get caught in depression 140, and gets moved with depression 140 in a similar manner as a hand pump piston. Moreover, if periphery 139 remains close to wall 109 of cooling hole 108, periphery 139 can act as a scraper to further remove material from walls 109 of cooling hole 108.

Figure 14:
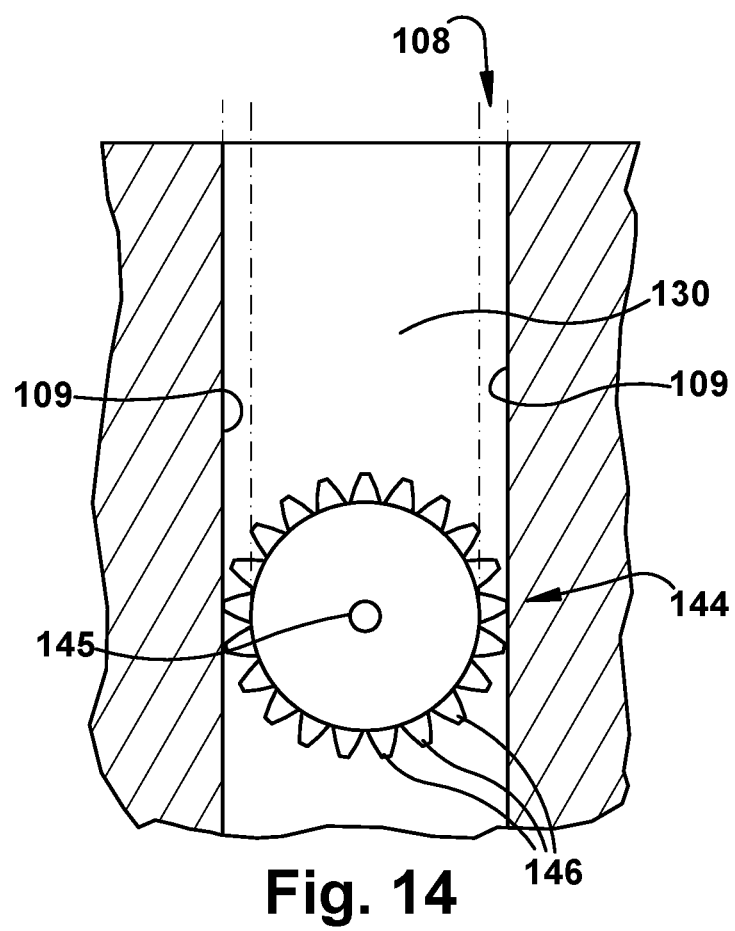
FIG. 14 shows a schematic perspective view of another and further embodiment of connective members of the sacrificial plug's cooling hole engaging portion engaging cooling hole at line 6-6 (FIG. 5) according to embodiments of the disclosure

FIG. 14 illustrates a further aspect of a connective member. In this aspect, connective member 144 is formed during additive manufacturing of the turbine component and the sacrificial plug 100 with the cooling hole engaging portion 130. Connective member 144 is additively manufactured in a generally circular configuration with gear-like teeth including a hub 145 and teeth 146. At least one and preferably two or more of the teeth 146 are additively manufactured with wall 109 of cooling hole 108. The hub 145 can be additively manufactured as a rotatable element on the cooling hole engaging portion 130 so as the sacrificial plug 100 is withdrawn gear shaped connective member 144 rotates about hub 145. During rotation, teeth 146 that remain on gear shaped connective member 144 can engage walls 109. In a similar manner as collector member 138, gear shaped connective member 144 can act as a scraper to further remove material from walls 109 of cooling hole 108.

Alternatively, if gear shaped connective member 144 does not rotate around hub 145, teeth 146 of gear shaped connective member 144 can engage walls 109. As the sacrificial plug 100 is removed from the cooling hole 108, gear shaped connective member 144 moves up in the cooling hole 108. Any materials (regardless of source) in cooling hole 108 can get caught in teeth 146 and/or moved with teeth 146.

The removal of sacrificial plug 100, as embodied by the disclosure and described above, can be done by applying a force upwardly in direction Z that is adequate to sever the additively manufactured connection between connective member 131 at its engagement with peripheral inner surface 109 of cooling hole 108. Further, as noted above, a rotational force in direction of arrow D may also be applied to sever connective member 131 from peripheral inner surface 109 of cooling hole 108. In a further aspect of the disclosure, top portion 110 of sacrificial plug 100 can be provide with structure to facilitate application of a rotational force in direction of arrow D. The structure to facilitate application of a rotational force enables a firmer grip by an individual. The structure may provide for engagement with a mechanism for mechanically applying rotational force thereto.

Figure 15:
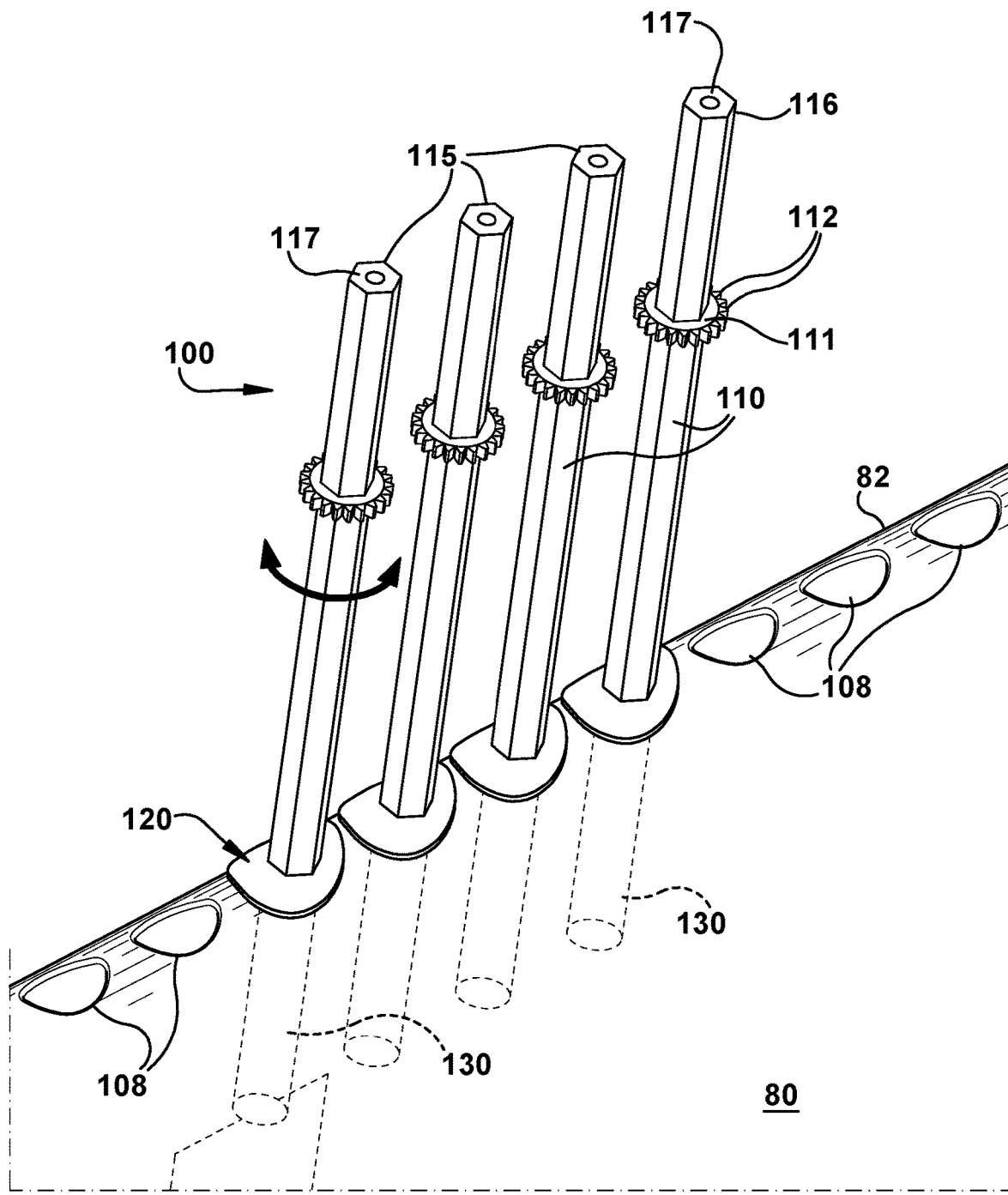
FIG. 15 shows a schematic perspective view of sacrificial plugs with a mechanism for mechanically applying rotational force according to embodiments of the disclosure.

In FIG. 15, top portion 110 of sacrificial plug 100 includes a gear structure 111 additively manufactured with top portion 110. The gear structure 111 includes teeth 112 that are engagable with motive devices to impart rotational movement thereto, thus enabling rotation of the entire sacrificial plug 100. Accordingly severing of connective member 131 from peripheral inner surface 109 of cooling hole 108 can be achieved. In one aspect of the disclosure, a complementary gear 202 (FIG. 16) can engage teeth 112 of gear structure 111 to rotate gear structure 111, and the entire sacrificial plug 100 (direction D). Thus, severing of connective member 131 from peripheral inner surface 109 of cooling hole 108 can be attained.

Figure 16:
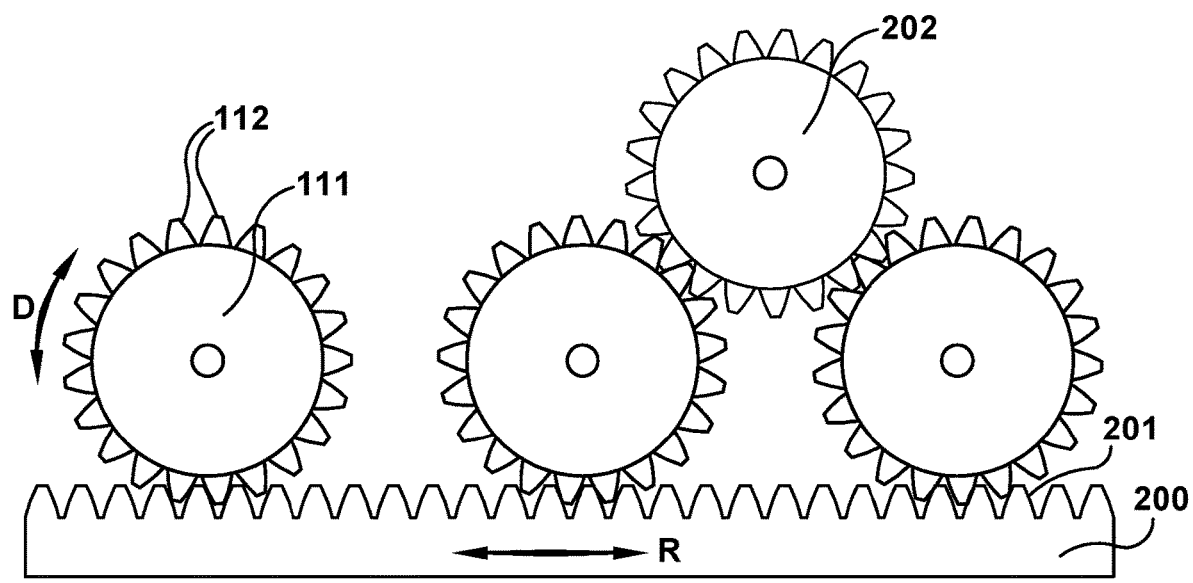
FIG. 16 shows a schematic perspective view of a mechanism for mechanically applying rotational force to sacrificial plugs according to embodiments of the disclosure.

Alternately, as illustrated in FIG. 16, gear 111 can mesh with a geared rack 200 including linear teeth 201. Thus, when the geared rack 200 is translated (arrow R), the engagement of teeth 112 and 201 produce rotation of sacrificial plug 100 via rotation of top portion 110. Rotation of the sacrificial plug 100 via rotation (direction D) of top portion 110 severs connective member 131 from peripheral inner surface 109 of cooling hole 108. Thereafter, the sacrificial plug 100 can be moved out of the cooling hole 108 in direction Z (FIG. 5).

Figure 17:
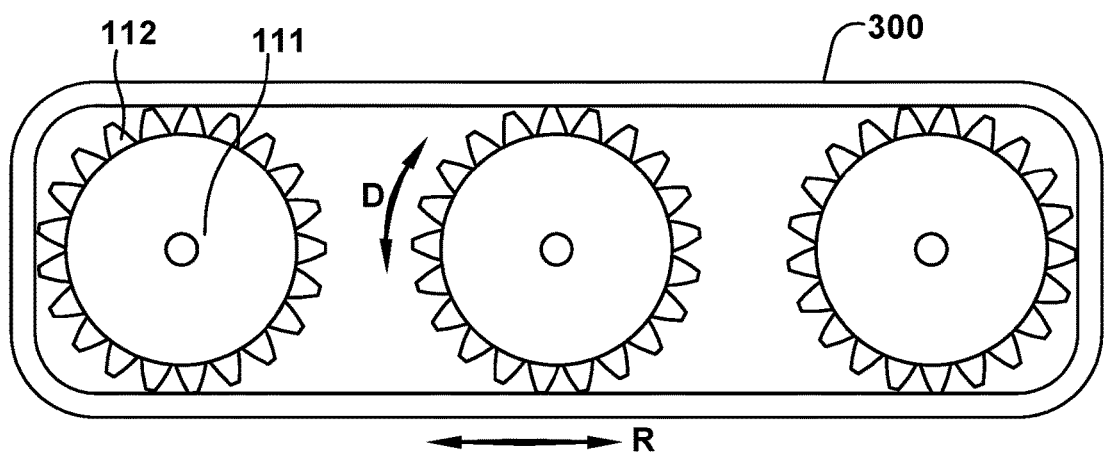
FIG. 17 shows a schematic perspective view of sacrificial plugs with a further mechanism for mechanically applying rotational force according to embodiments of the disclosure.

FIG. 17 illustrates a further configuration for severing of connective member 131 from peripheral inner surface 109 of cooling hole 108. A strap or binding belt 300 (hereafter "belt" 300) is fit over one or more gear 111 on top portion 110 of sacrificial plug 100. The fit of the belt 300 over one or more gear 111 is a frictional engagement so as belt 300 moves in a clockwise or counter clockwise direction (arrow R in FIG. 17) gears 111 rotate. Belt 300 frictionally engages and rotates teeth 112, rotates gear 111, and thus rotates (direction D) sacrificial plug 100 via rotation of top portion 110. By virtue sacrificial plug 100 rotation, connective member(s) 131 is severed from peripheral inner surface 109 of cooling hole 108. Thereafter, sacrificial plug 100 can be moved out of cooling hole 108 in direction Z (FIG. 5).

Another aspect of the disclosure provides forming top portion 110 of sacrificial plug 100 with an aperture or slot 115 (FIGS. 2 and 15 in particular) at an end surface 117. The aperture or slot (hereafter "slot") 115 is configured to be engaged by a mechanical device to impart rotation to top portion 110, and thus the sacrificial plug 100. The rotation of sacrificial plug 100 via rotation of slot 115 severs connective member 131 from peripheral inner surface 109 of cooling hole 108. The slot 115 can be a flat-head slot, Philips or cruciform slot, Robertson or other polygonal slot, ratchet slot, or any other slot configuration now known or hereinafter developed. The slot 115 can be engagable with a complementary tool, such as a screwdriver, drill, ratchet, driver, socket, Allen wrench, or any other tool for rotating, now known or hereafter developed.

A further aspect of the disclosure includes forming the top portion 110 of the sacrificial plug 100 in a polygonal shape. Polygonal shape of top portion 110 can engage with a complementary tool, such as but not limited to a ratchet, socket, wrench, pliers, or any other suitable device for imparting rotation. As illustrated in FIGS. 2 and 15, the rightmost (in the figures for ease of illustration) top portion 110 is additively manufactured with end surface 117 in a polygonal shape 116 (illustrated hexagonal for illustrative purposes only). Thus, rotation of sacrificial plug 100 via rotation of polygonal shape 116 end surface 117 severs connective member 131 from peripheral inner surface 109 of cooling hole 108.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" as applied to a particular value of a range applies to both end values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. An sacrificial plug system, the sacrificial plug system comprising:
    a component having a surface and at least one cooling hole in the surface;
    a sacrificial plug integrally formed with the component and integrally formed in the at least one cooling hole, the sacrificial plug including:
        a top portion;
        a cover portion; and
        a bottom portion, the bottom portion integrally formed, engaged to and connected to at least one cooling hole; and
    at least one connective member integrally formed with the bottom portion of the sacrificial plug and integral with an inner wall of each respective at least one cooling hole; each at least one connective member being severable from the respective inner wall of its respective at least one cooling hole when a force is applied to the top portion, thus permitting the sacrificial plug to be removed from the at least one respective cooling hole.

2. The sacrificial plug system according to claim 1, wherein the cover portion is spaced a predetermined distance above the surface and the respective at least one cooling hole.

3. The sacrificial plug system according to claim 2, wherein the cover portion includes a cover portion contour and the component has a component contour, the cover portion contour mirrors the component contour.

4. The sacrificial plug system according to claim 2, wherein the sacrificial plug system further includes a coating applied to the integrally formed component, the sacrificial plug, and the at least one connective member, the predetermined distance permitting coating access under the cover portion and preventing the coating from entering each respective at least one cooling hole, wherein the predetermined distance prevents bridging of the coating between adjacent ones of the at least one cooling hole.

5. The sacrificial plug system according to claim 4, wherein the cover portion is not coaxial with an axis of each respective at least one cooling hole.

6. The sacrificial plug system according to claim 1, wherein the integrally formed component, the sacrificial plug, and the at least one connective member are integrally additively manufactured.

7. The sacrificial plug system according to claim 1, wherein the component includes a turbine blade, and the surface includes a trailing edge with a plurality of the at least one cooling hole, and wherein a plurality of the at least one connective member is formed in a respective cooling hole on the trailing edge of the turbine blade.

8. The sacrificial plug system according to claim 1, wherein the top portion includes a configuration enabling rotation of the sacrificial plug to sever each respective at least one connective member from the wall of the respective at least one cooling hole.

9. The sacrificial plug system according to claim 8, wherein the top portion includes at least one of knurled surfaces; contoured surfaces; rounded surfaces; prismatic surfaces; knobbed surfaces; hooked surfaces; surfaces that facilitate engagement to provide motive forces to remove; and wherein the top portion includes at least one of a solid portion, hollow portion, and a lattice portion.

10. The sacrificial plug system according to claim 8, wherein the top portion includes a gear structure integral with the top portion, the gear structure including teeth, the teeth engaging at least one motive device to rotate the gear structure and accordingly rotate the sacrificial plug to sever the at least one connective member of the sacrificial plug.

11. The sacrificial plug system according to claim 10, wherein the at least one motive device includes at least one of a complementary gear, a geared rack with linear teeth, and a binding belt.

12. The sacrificial plug system according to claim 10, wherein the at least one motive device engages gear structures on multiple sacrificial plugs.

13. The sacrificial plug system according to claim 10, wherein the top portion includes an end surface with an aperture, the aperture engaging with a mechanical device to rotate the gear structure and accordingly rotate the sacrificial plug to sever the at least one connective member of the sacrificial plug.

14. The sacrificial plug system according to claim 1, wherein the at least one connective member includes a plurality of connecting members.

15. The sacrificial plug system according to claim 14, wherein the plurality of connecting members includes at least one of:

finger connective members; polygonal finger connective members; screw-thread connective members; webs of connective members; and strut-surrounded webs of connective members.

16. The sacrificial plug system according to claim 1, wherein the at least one connective member includes a zone of at least one of reduced density, elasticity, and malleability, the zone includes at least one of increased stiffness and brittleness compared to a remainder zone of connective member, wherein the zone being connected to the wall of the at least one cooling hole, and the zone severs before the remainder zone of the at least one connective member.

17. The sacrificial plug system according to claim 16, wherein the remainder of the at least one connective member scrapes the wall of the at least one cooling hole as the sacrificial plug is removed from the at least one cooling hole.

18. The sacrificial plug system according to claim 16, wherein the remainder zone of the at least one connective member includes a capture member, wherein the capture member includes a trough to collect materials.

19. The sacrificial plug system according to claim 1, wherein the at least one connective member includes a gear configuration with at least two teeth thereon, the at least two teeth connect to the wall of the at least one cooling hole.

20. The sacrificial plug system according to claim 19, wherein the gear configuration can rotate at a connection with the bottom portion.

\* \* \* \* \*